United States Patent
Houdashell (10) Patent No.: US 11,235,348 B2
(45) Date of Patent: Feb. 1, 2022

(54) SYSTEM AND METHOD FOR ROTATING AN EGG-SHAPED OBJECT FOR THE PURPOSE OF APPLYING DECORATIONS

(71) Applicant: Hey Buddy Hey Pal Investments LLC, Amarillo, TX (US)

(72) Inventor: Gale Scott Houdashell, Amarillo, TX (US)

(73) Assignee: Hey Buddy Hey Pal Investments LLC, Amarillo, TX (US)

( * ) Notice: Subject to any disclaimer, the term of this patent is extended or adjusted under 35 U.S.C. 154(b) by 0 days.

(21) Appl. No.: 17/031,886

(22) Filed: Sep. 24, 2020

(65) Prior Publication Data

US 2021/0008589 A1   Jan. 14, 2021

Related U.S. Application Data (63) Continuation-in-part of application No. 15/481,825, filed on Apr. 7, 2017, now abandoned.

(51) Int. Cl.
  *B05C 13/02* (2006.01)
  *B44D 3/00* (2006.01)
  *A01K 43/10* (2006.01)

(52) U.S. Cl.
  CPC ............ *B05C 13/02* (2013.01); *B05C 13/025* (2013.01); *B44D 3/00* (2013.01); *A01K 43/10* (2013.01)

(58) Field of Classification Search
  CPC ....... B05C 13/02; B05C 13/025; A47G 33/08; A47F 5/025; A47F 3/00; B23Q 27/00; A01K 43/10; A23L 5/40; B44D 3/00; B44D 3/22; B44D 2/00; B65G 2207/42; B65G 47/24; B65G 23/08; B07C 5/16;
  (Continued)

(56) References Cited

U.S. PATENT DOCUMENTS

| 801,795 A | 10/1905 | Koelsch et al. |
| 1,663,987 A * | 3/1928 | Murdock ................. A23B 7/16 |
| | | 118/107 |
| 2,194,974 A | 3/1940 | Elswick |

(Continued)

FOREIGN PATENT DOCUMENTS

| CH | 572713 A5 * | 2/1976 |
| DE | 3903621 | 3/1990 |

(Continued)

*Primary Examiner* — Laura Edwards
(74) *Attorney, Agent, or Firm* — LaMorte & Associates P.C.

(57) ABSTRACT

A system and method for rotating an egg-shaped object for decoration. The system uses a machine with an access opening. An open area exists within the interior of the housing between the access opening and a bottom surface. A support cradle is disposed within the interior. The support cradle has a first plurality of wheels that extend into the open area from a first direction and a second plurality of wheels that extend into the open area from a second direction. A gap space exists between the first plurality of wheels and the second plurality of wheels. The first plurality of wheels, the second plurality of wheels and the gap space form a cradle that receive and rotate an egg-shaped object. When in this cradle, at least half of the egg-shaped object is elevated above the top surface of the housing, where it can be easily decorated.

19 Claims, 5 Drawing Sheets

(58) Field of Classification Search
CPC ......... B07C 5/36; B65B 23/00; Y10S 118/06;
Y10T 82/25; B44C 5/00
USPC .................................................... 118/13, 14
See application file for complete search history.

(56) References Cited

U.S. PATENT DOCUMENTS

| | | |
|---|---|---|
| 2,327,754 A | 8/1943 | Young |
| 2,895,589 A | 6/1958 | Rostron |
| 3,792,163 A | 2/1974 | Fudro |
| 3,848,564 A | 11/1974 | Kull |
| 3,857,472 A | 12/1974 | Klint |
| 4,161,366 A | 7/1979 | Bol et al. |
| 4,520,753 A | 6/1985 | Breuninger |
| 4,531,475 A | 7/1985 | Thill |
| 4,569,444 A | 2/1986 | McEvoy |
| 5,785,998 A | 7/1998 | Kolobow |
| 5,895,679 A | 4/1999 | Pender |
| 8,770,561 B2 | 7/2014 | Gagnon |
| 2009/0148590 A1 | 6/2009 | Delap |
| 2009/0317537 A1 | 12/2009 | Andreacchi |

FOREIGN PATENT DOCUMENTS

| | | |
|---|---|---|
| DE | 3943371 | 7/1990 |
| JP | 2014185008 | 10/2014 |

\* cited by examiner

SYSTEM AND METHOD FOR ROTATING AN EGG-SHAPED OBJECT FOR THE PURPOSE OF APPLYING DECORATIONS

RELATED APPLICATIONS

This application is a continuation-in-part of U.S. patent application Ser. No. 15/481,825, filed Apr. 7, 2017, now abandoned.

BACKGROUND

1. Field of the Invention

In general, the present invention relates to systems and methods for rotating an egg-shaped object, such as a chicken egg or a plastic Easter egg. More particularly, the present invention relates to systems and methods for rotating an egg-shaped object so that the object can be decorated as the object turns.

2. Prior Art Description

Many people enjoy decorating eggs and egg-shaped objects. Decorated eggs are used in the décor of many homes. Likewise, many families decorate eggs for holidays, such as Easter.

There exist many ways to decorate eggs. Eggs can be dipped into colored dyes. Likewise, eggs can be manually colored using paint, ink markers, pencils and/or crayons. Traditionally, an egg or other egg shaped object is held in one hand while being decorated by the other hand. This process is difficult because the egg is being held in a hand and the entire surface of the egg is not available for decorating. Rather, the egg must be manipulated between the hands without smearing or smudging the colors that have already been applied and/or without dropping the egg. This process is especially challenging for small children who lack the motor skills to manipulate an egg with one hand while applying color with the other.

One way to simplify the process of decorating an egg is to use a machine to rotate the egg while colors and other decorations are manually applied. In U.S. Pat. No. 3,848,564 to Kull, an egg lathe system is shown. This system rotates the egg by positioning the egg between two end caps. One of the end caps can be spun, therein causing the egg to rotate. There are two primary problems associated with such prior art systems. First, the end caps cover significant areas of the egg. These areas cannot be decorated while the egg is rotating. Second, all natural eggs vary in shape and size. Engaging an egg on a lathe must be done gently, so as not to crush the egg. However, a gentle attachment to the lathe means that the egg can be readily displaced from the lathe by the application of a lateral force. When a child presses a marker, pencil or crayon against an egg, significant lateral forces can be created. The result is that the egg often falls from the lathe while being decorated. This can ruin the decoration scheme and/or crack the egg.

In order to prevent the problem of an egg falling from a lathe, prior art decorating devices have been invented where an egg rests upon a roller. Since the egg is physically resting on a roller, the egg cannot fall. Such prior art is exemplified by U.S. Pat. No. 2,327,754 to Young. Eggs are naturally oblong in shape. Since the egg is resting on a cylindrical roller, there is nothing to prevent the egg from rocking and turning when it is contacted. Accordingly, the egg must be rotated very slowing to maintain stability. Furthermore, decorations can only be applied with very light forces in order to prevent the egg from rocking and turning with the force of application and/or disrupting the application of the decoration.

In commercial applications, eggs are often marked with ink. This is typically done to print a trademark or expiration date onto the surface of the egg. In industry, eggs are placed on conveyors. The conveyors advance the eggs under a printing head that sprays ink onto the eggs. Such prior art is exemplified by German Patent DE 3903621 to Stracke. The Stracke patent shows a system for spraying eggs. The eggs are placed on a conveyer belt. Support discs are provided on the conveyer belt to orient the eggs. Although the eggs are oriented by the support discs, the eggs are not actively rotated. Furthermore, although the support discs prevent the eggs from turning sideways on the conveyor belt, the support discs do not prevent the eggs from rocking on the conveyor belt. The prevention of rocking is not important in the Stracke patent because the eggs are sprayed. The orientation of the egg is irrelevant and very little force is applied to the egg by the application of ink.

A need therefore exists for a system and method specifically designed to rotate a single egg-shaped object for custom decorating that both stabilizes the object as it rotates and exposes all relevant surfaces of the object to the decorator. A need also exists for a system that not only exposes all surfaces for decoration but also prevents the egg from rocking and twisting as significant lateral forces are applied during the decorating process. These needs are met by the present invention as described and claimed below.

SUMMARY OF THE INVENTION

The present invention is a system and method for rotating an egg-shaped object so that the object can be easily decorated. The system uses a machine that rotates the egg-shaped object. The machine has a housing with a top surface, a bottom surface, and an interior between the top surface and the bottom surface.

An access opening is provided in the top surface of the housing. An open area exists within the interior of the housing between the access opening and the bottom surface. A support cradle is disposed within the interior of the housing. The support cradle has a first plurality of wheels that extend into the open area from a first direction and a second plurality of wheels that extend into the open area from a second direction. A gap space exists in the open area between the first plurality of wheels and the second plurality of wheels. The first plurality of wheels, the second plurality of wheels and the gap space form a cradle in the open area that can receive and hold an egg-shaped object. When held in this cradle, at least half of the egg-shaped object is elevated above the top surface of the housing, where it can be easily decorated.

At least one of the wheels in the support cradle is connected to a gearbox and motor. When the motor is activated, the motor turns the wheel. The wheel turns the egg-shaped object and the egg-shaped object turns the remaining wheels. The wheels are positioned to stabilize the egg-shaped object and prevent the egg-shaped object from rocking or otherwise shifting in orientation as it rotates and is being decorated.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention decorating system can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered a limitation when interpreting the scope of the appended claims.

Figure 1:
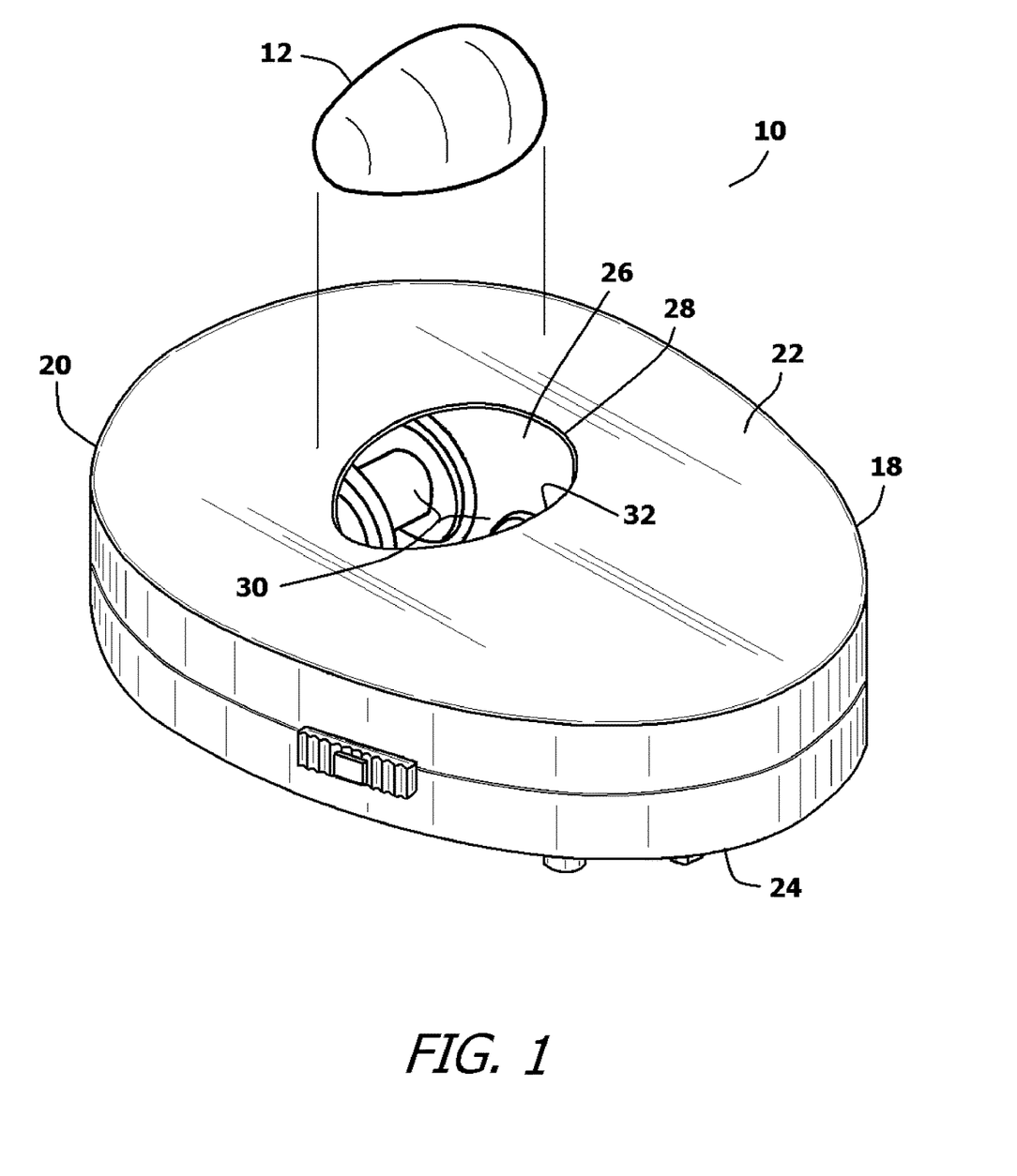
FIG. 1 shows an exemplary embodiment of a decorating system shown in conjunction with an egg to be decorated.
Figure 2:
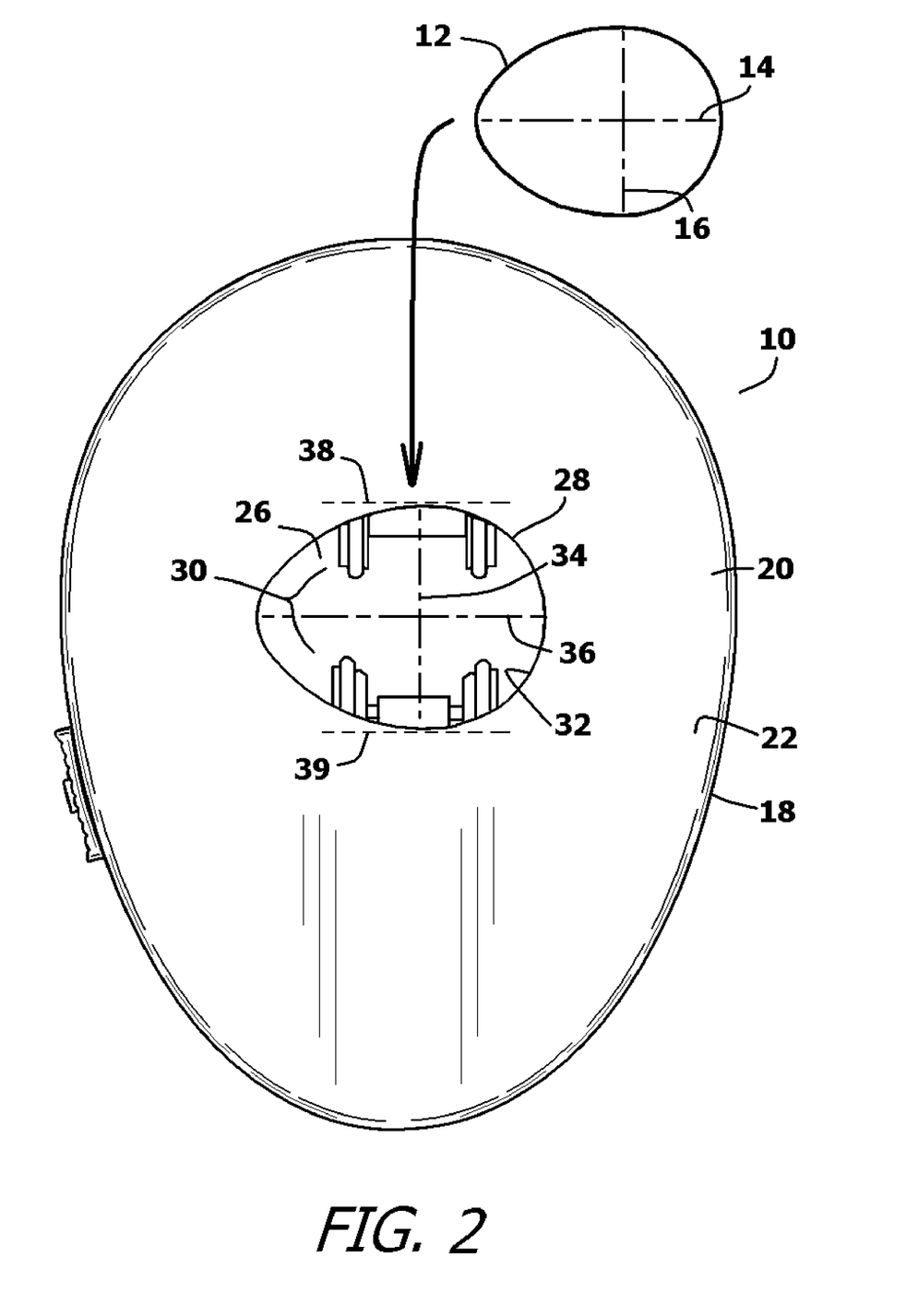
FIG. 2 shows a side view of the decorating system of FIG. 1, shown with the egg in position for decoration.

Referring to FIG. 1, in conjunction with FIG. 2, a decorating system 10 is shown that is intended for use in decorating an egg-shaped object 12, such as a hardboiled chicken egg or a plastic Easter egg. Egg-shaped objects 12 are oblong in shape, having a maximum length along a long axis 14 and a maximum width along a short axis 16. The long axis 14 and short axis 16 are perpendicular, wherein the short axis 16 intersects the long axis 14 closer to one end of the long axis 14 than the other.

The decorating system 10 utilizes a machine 18 designed to rotate the egg-shaped object 12 about its long axis 14, while remaining in an otherwise stationary position. The machine 18 has a housing 20 that has a flat top surface 22 and an opposite bottom surface 24. The housing 20 defines an interior 26 between the flat top surface 22 and the bottom surface 24. An access opening 28 is formed in the flat top surface 22 to provide access to an open area 29 within the interior 26. The open area 29 is the area within the interior 26 of the housing 20 that is positioned directly between the bottom surface 24 and the access opening 28 on the flat top surface 22.

A support cradle 30 is mounted within the interior 26 of the housing 20. The support cradle 30 is positioned to hold the egg-shaped object 12 in an elevated position within the open area 29 of the housing 20. The support cradle 30 also rotates elevated the egg-shaped object 12 about its long axis 14. As will be explained, the egg-shaped object 12 is placed into the support cradle 30 through the access opening 28 in the flat top surface 22. The access opening 28 in the flat top surface 22 of the machine 18 is preferably egg-shaped in order to demonstrate the proper orientation of the egg-shaped object 12, when being placed into the support cradle 30 through the access opening 28.

When placed into the support cradle 30 within the housing 20, the egg-shaped object 12 is supported above the bottom surface 24 of the housing 20. At this elevation, the egg-shaped object 12 partially extends through the access opening 28 and above the flat top surface 22 of the housing 20. For an egg-shaped object 12 that is the size of an average chicken egg, the support cradle 30 supports the egg-shaped object 12 so that the long axis 14 of the egg-shaped object 12 is at, or above, the flat top surface 22. As a consequence, for an average sized chicken egg, at least half of the egg would be exposed above the flat top surface 22 of the machine 18 and the remainder extends into the open area 29 below the flat top surface 22.

The egg-shaped access opening 28 on the flat top surface 22 of the machine 18 has a peripheral edge 32. The access opening 28 is sized so that the peripheral edge 32 of the access opening 28 will be positioned no farther than two centimeters from the egg-shaped object 12, when the egg-shaped object 12 is resting within the support cradle 30. The proximity of the peripheral edge 32 to the egg-shaped object 12 enables the peripheral edge 32 to act as a guide rail to the egg-shaped object 12 as it spins. The presence of the peripheral edge 32 physically prevents the egg-shaped object 12 from being pushed laterally out of the support cradle 30 while rotating. Rather, should the egg-shaped object 12 encounter enough force to be moved from the support cradle 30, the egg-shaped object 12 would contact the peripheral edge 32 of the access opening 28 and the egg-shaped object 12 would rebound back onto the support cradle 30.

Referring to FIG. 2, it can be seen that the egg-shaped access opening 28 in the flat top surface 22 of the housing 20 has a long axis 34 and a short axis 36 that are perpendicular to each other. Two tangent lines 38, 39 on the access opening 28 are shown. The tangent lines 38, 39 are tangential to the curve of the access opening 28, wherein the tangent lines 38, 39 are perpendicular to the short axis 36 and parallel to the long axis 34 of the access opening 28. The tangent lines 38, 39 are used for orientation as is later explained.

Figure 3:
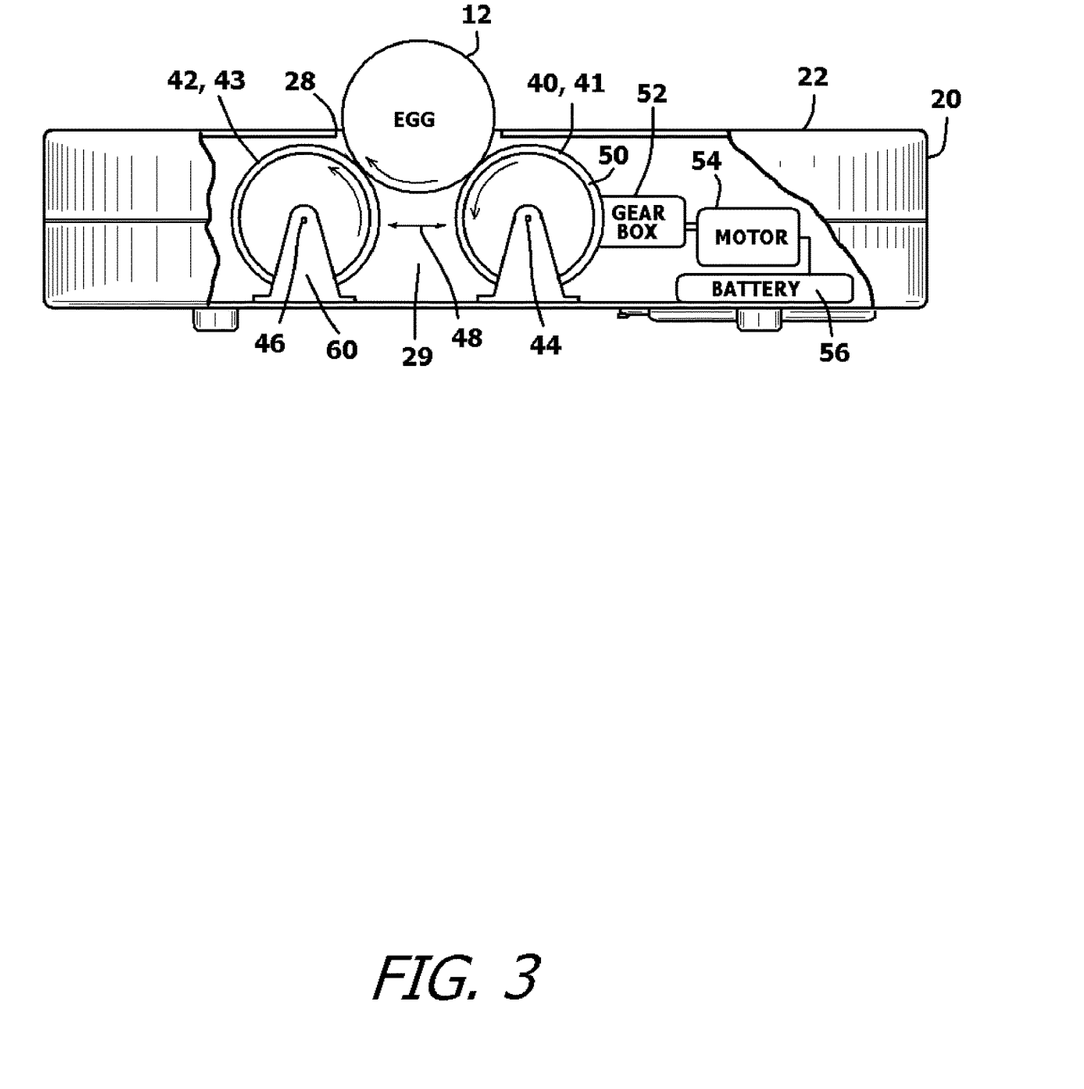
FIG. 3 shows a top view of the decorating system of FIG. 1, shown with the egg in an offset position.
Figure 4:
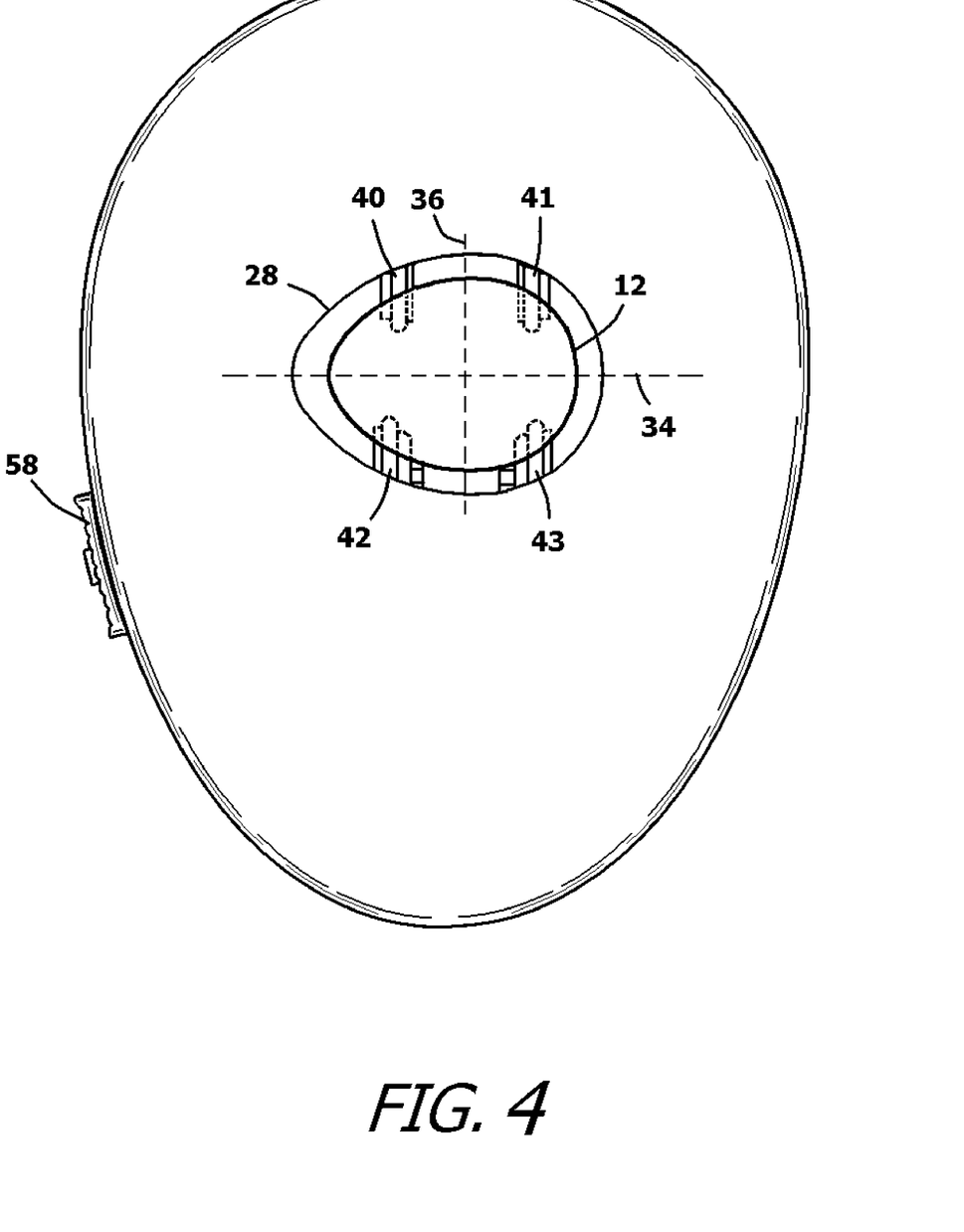
FIG. 4 is a cross-sectional view of the exemplary embodiment of FIG. 2 showing the primary components of the decorating system.

Referring to FIG. 3 in conjunction with FIG. 4 and FIG. 2, it can be seen that although the support cradle 30 is mounted within the interior 26 of the housing 20, only some of the support cradle 30 extends into the open area 29 under the access opening 28. The support cradle 30 contains two pluralities of support wheels 40, 41, 42, 43. In the first plurality of support wheels 40, 41, the support wheels 40, 41 rotate in parallel planes and rotate about a first common axis 44. The first common axis 44 is parallel to the long axis 34 of the egg-shaped access opening 28. The first common axis 44 is positioned to be no closer to the open area 29 than is the first tangent line 38. The first common axis 44 can be positioned vertically under the first tangent line 38 but no closer than the first tangent line 38. Positioned in such a manner, no more than half of each wheel 40, 41 will extend into the open area 29 under the access opening 28. Likewise, in the second plurality of support wheels 42, 43, the support wheels 42, 43 rotate in parallel planes and rotate about a second common axis 46. The second common axis 46 is also parallel to the long axis 34 of the egg-shaped access opening 28. The second common axis 46 is positioned to be no closer to the open area 29 than is the second tangent line 39. The second common axis 46 can be positioned vertically under the second tangent line 38 but no closer than the second tangent line 38. Positioned in such a manner, no more than half of each wheel 42, 43 will extends into the open area 29 under the access opening 28.

The first plurality of wheels 40, 41 extend into the open area 29 under the access opening 28 from one side of the open area 29. The second plurality of wheels 42, 43 extend into the open area 29 from the opposite side of the open area 29. The wheels 40, 41, 42, 43 are sized so that a gap space 48 exists between the first plurality of wheels 40, 41 and the second plurality of wheels 42, 43. The gap space 48 is centered under the long axis 34 of the access opening 28. The gap space 48 has a preferred width of between one centimeter and three centimeters, which is smaller than the diameter of an average chicken egg.

Each of the wheels 40, 41, 42, 43 retains an O-ring 50 along its periphery. The O-ring is preferably a silicone O-ring or a similar elastomeric material. The O-ring provides a very narrow point of contact between the wheels 40, 41, 42, 43 and the egg-shaped object 12. Furthermore, the elastomeric material does not lift and smear any ink, paint or crayon wax it may encounter on the egg-shaped object 12.

Within the first plurality of wheels 40, 41, at least one of the wheels 40, 41 is attached to a gearbox 52. The gearbox 52 is powered by an electric motor 54. The electric motor 54 is connected to batteries 56 in a circuit that has an on/off switch 58 for selectively activating and deactivating the motor 54. When the motor 54 is activated, the motor 54 powers the gearbox 52. The gearbox 52 turns the first plurality of wheels 40, 41. In the shown embodiment the two wheels 40, 41 are turned simultaneously. This is exemplary and it should be understood that any one, or all, of the first plurality of wheels 40, 41 can be actively driven.

The second plurality of wheels 42, 43 are supported on a yoke mount 60. The second plurality of wheels 42, 43 are free spinning on the yoke mount 60. The second plurality of wheels 42, 43 have a different spacing between wheels, than does the first plurality of wheels 40, 41. Since the spacing between the second plurality of wheels 42, 43 is different from the spacing between the first plurality of wheels 40, 41, all four wheels 40, 41, 42, 43 rotate in different parallel planes. Accordingly, the positions of the first plurality of wheels 40, 41 on the first side of the open area 29 do not align with the positions of the second plurality of wheels 42, 43 on the opposite side of the open area 29.

Referring to FIG. 4 in conjunction with FIG. 3, it will be understood that the first plurality of wheels 40, 41 extends into the open area 29 under the access opening 28 in such a manner that the plane of rotation for each of the wheels 40, 41 is parallel to the short axis 36 of the access opening 28. Furthermore, each wheel 40, 41 is positioned on an opposite side of the short axis 36. That is, one wheel 40 is on one side of the short axis 36 in FIG. 4 and one wheel 41 is on the opposite side of the short axis 36. This positioning is important for stabilization during operation. Likewise, the second plurality of wheels 42, 43 are oriented in such a manner that the plane of rotation for each of the wheels 42, 43 is parallel to the short axis 36 of the access opening 28. Furthermore, each wheel 42, 43 in the second plurality are positioned on opposites sides of the short axis 36. That is, the one wheel 42 is on one side of the short axis 36 in FIG. 4 and one wheel 43 is on the opposite side of the short axis 36. This positioning is important for stabilization during operation.

Figure 5:
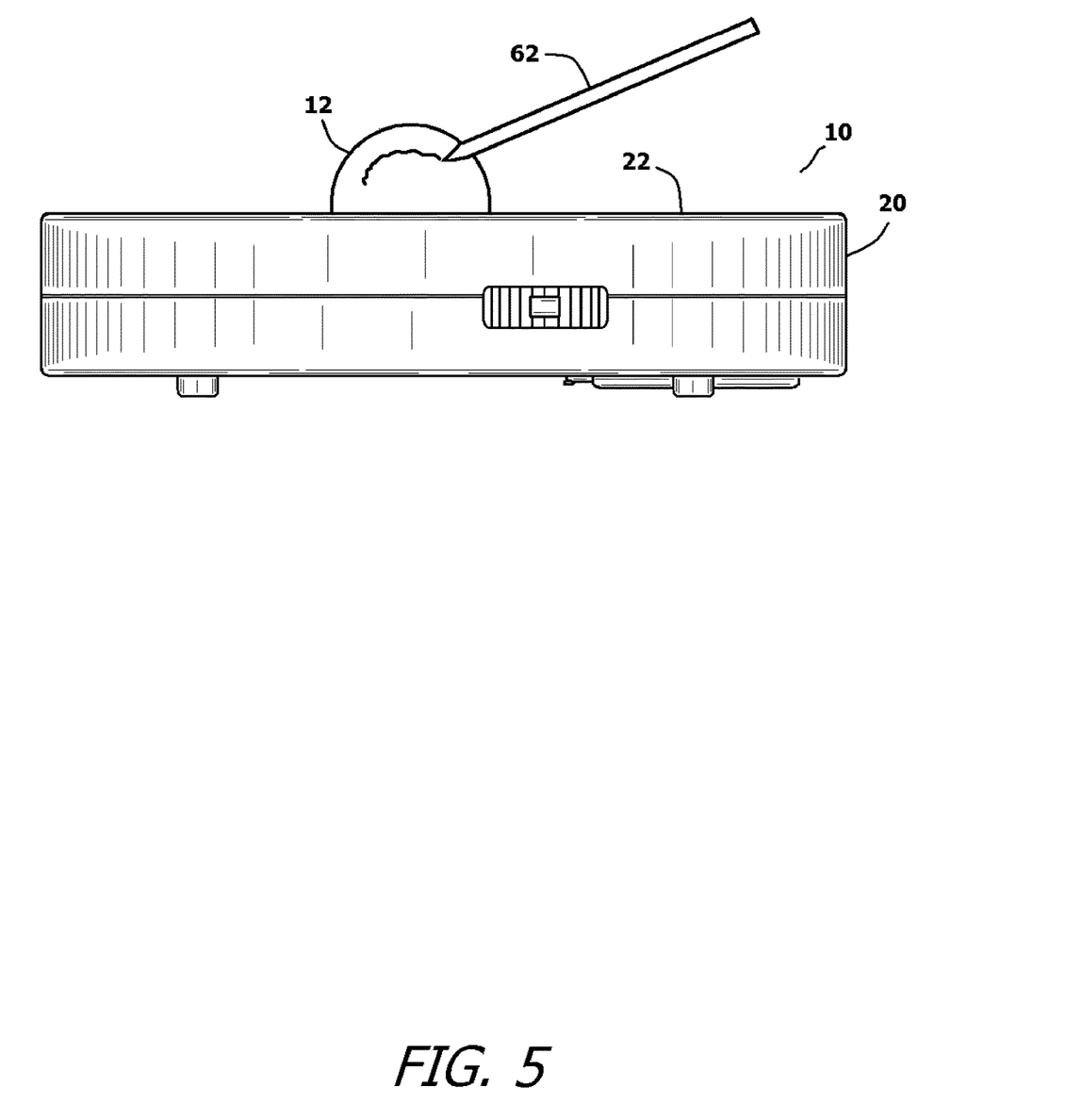
FIG. 5 is an enlarged view of the support cradle within the decorating system show retaining and rotating an egg.

Referring to FIG. 5, in conjunction with FIG. 4 and FIG. 3, it will be understood that in order to use the decorating system 10, an egg-shaped object 12 such as a chicken egg, is placed onto the support cradle 30. That is, the egg-shaped object 12 is placed into the gap space 48 between the first plurality of wheels 40, 41 and the second plurality of wheels 42, 43 until the egg-shaped object 12 rests upon the various wheels 40, 41, 42, 43. In this position, the wheels 40, 41, 42, 43 support the egg-shaped object 12 and at least half of the egg-shaped object 12 remains exposed above the flat top surface 22 of the housing 20. The exposed area of the egg-shaped object 12 can be contacted with a marking device 62, such as a pen, pencil, marker, crayon, or paintbrush.

The egg-shaped object 12 is biased into the gap space 48 and against the various wheels 40, 41, 42, 43 by gravity. Once the egg-shaped object 12 is properly positioned, the motor 54 is activated. The motor 54 drives the gearbox 52 and the gearbox 52 turns the first plurality of wheels 40, 41 in a first rotational direction. The first plurality of wheels 40, 41 directly contact surface of the egg-shaped object 12. The rotation of the first plurality of wheels 40, 41 and the orientation of the egg-shaped object 12 cause the egg-shaped object 12 to rotate in the opposite direction about the long axis 34 of the egg-shaped object 12. Since the egg-shaped object 12 is also in contact with the second plurality of wheels 42, 43, the rotation of the egg-shaped object 12 causes the second plurality of wheels 42, 43 to spin. The second plurality of wheels 42, 43 rotate in the same direction as the first plurality of wheels 40, 41. The egg-shaped object 12 is supported by the four wheels 40, 41, 42, 43. Each of the four wheels 40, 41, 42, 43 contacts the egg-shaped object 12 at a different point along the long axis 34 of the egg-shaped object 12. Furthermore, two wheels contact the egg-shaped object 12 on each side of the long axis 34. Likewise, two wheels contact the egg-shaped object 12 on opposite sides of its short axis 36. This provides stability to the egg-shaped object 12 along both its long axis 34 and its short axis 36 as it rotates about its long axis 34. Furthermore, it will be understood that the egg-shaped object 12 is contacted by a marking device 62 as it rotates. This creates lateral forces that can act to displace the egg-shaped object 12 from the support cradle 30. These lateral forces are suppressed by the pull of gravity against the wheels 40, 41, 42, 43 and the position of the wheels 40, 41, 42, 43 on opposite sides of both the long axis 34 and the short axis 36. However, should the egg-shaped object 12 be contacted with a force great enough to move the egg-shaped object 12 away from the wheels 40, 41, 42, 43, the egg-shaped object 12 would contact with the peripheral edge 32 of the access opening 28. The egg-shaped object 12 will rebound from the contact and will fall back into the support cradle 30 and contact with all the wheels 40, 41, 42, 43.

The embodiment of the present invention that is illustrated and described is merely exemplary and a person skilled in the art can make many variations to that embodiment using equivalent components. All such embodiments are intended to be included within the scope of the present invention as defined by the claims.

What is claimed is:

1. A device for rotating an egg-shaped object, comprising:
    a housing having a top surface and a bottom surface, wherein said housing defines an interior between said top surface and said bottom surface;
    an access opening in said top surface of said housing, wherein an open area exists within said interior of said housing between said access opening and said bottom surface;
    a first plurality of wheels disposed within said interior of said housing, said first plurality of wheels extending into said open area from a first direction;
    a second plurality of wheels disposed within said interior of said housing that extend into said open area from a second direction, wherein a gap space exists in said open area between said first plurality of wheels and said second plurality of wheels, and wherein said first plurality of wheels and said second plurality of wheels form a support cradle that can support said egg-shaped object in said gap space;
    a motor disposed within said housing for turning at least one of said first plurality of wheels.

2. The device according to claim 1, wherein said second plurality of wheels are free turning.

3. The device according to claim 1, wherein said access opening is egg-shaped, having a first axis and a second axis, wherein said second axis is shorter than said first axis and perpendicular to said first axis.

4. The device according to claim 3, wherein said first plurality of wheels extend into said open area below said access opening under a first side of said first axis.

5. The device according to claim 4, wherein said second plurality of wheels extend into said open area below said access opening under a second side of said first axis, wherein said second side is opposite said first side.

6. The device according to claim 3, wherein both said first plurality of wheels and said second plurality of wheels have wheels that extend into said open area below said access opening under a first side of said second axis.

7. The device according to claim 6, wherein both said first plurality of wheels and said second plurality of wheels have wheels that extend into said open area below said access opening under a second side of said second axis, wherein said second side is opposite said first side.

8. The device according to claim 1, wherein said top surface of said housing is planar surrounding said access opening.

9. The device according to claim 3, wherein said first plurality of wheels rotates around a first common axis, wherein said first common axis is parallel to said first axis of said access opening.

10. The device according to claim 9, wherein said first common axis is disposed within said interior of said housing and does not extend into said open area.

11. The device according to claim 8, wherein said second plurality of wheels rotates around a second common axis, wherein said second common axis is parallel to said first axis of said access opening.

12. The device according to claim 11, wherein said second common axis is in said interior of said housing and does not extend into said open area.

13. The device according to claim 3, wherein said first plurality of wheels and said second plurality of wheels rotate in planes that are parallel to said second axis of said access opening.

14. The device according to claim 1, wherein said first plurality of wheels and said second plurality of wheels have peripheral rims that retain elastomeric O-rings.

15. A device for rotating an egg-shaped object, comprising:
    a housing having a top surface and a bottom surface, wherein said housing defines an interior between said top surface and said bottom surface;
    an access opening in said top surface of said housing, said access opening being egg-shaped and having a first axis and a second axis, wherein an open area exists within said interior of said housing between said access opening and said bottom surface;
    a first plurality of wheels, disposed within said interior of said housing, that extends into said open area from a first direction;
    a second plurality of wheels, disposed within said interior of said housing, that extends into said open area from a second direction, wherein said first plurality of wheels and said second plurality of wheels support said egg-shaped object;
    a motor disposed within said housing for turning at least one of said first plurality of wheels.

16. The device according to claim 15, wherein said first plurality of wheels rotate around a first common axis, wherein said first common axis is parallel to said first axis of said access opening.

17. The device according to claim 16, wherein said first common axis is disposed within said interior of said housing and does not extend into said open area.

18. The device according to claim 15, wherein said second plurality of wheels rotate around a second common axis, wherein said second common axis is parallel to said first axis of said access opening.

19. A device for rotating an egg-shaped object, comprising:
    a housing having a top surface and an interior;
    an access opening in said top surface of said housing, wherein an open area exists within said interior of said housing below said access opening;
    a first wheel disposed within said interior of said housing that extends into said open area from a first direction;
    a second wheel disposed within said interior of said housing that extends into said open area from a second direction, wherein a gap space exists between said first wheel and said second wheel within said open area, wherein said first wheel and said second wheel form a cradle sized to support said egg-shaped object within gap space and said access opening; and
    a motor disposed within said housing for turning at least one of said first plurality of wheels.

* * * * *